United States Patent [19]
Chase et al.
[11] 4,408,851
[45] Oct. 11, 1983

[54] PHOTOGRAPHIC METHOD FOR PRINTING A VIEWING-SCREEN STRUCTURE USING A LIGHT-TRANSMISSION FILTER

[75] Inventors: Thomas L. Chase; George M. Ehemann, Jr., both of Lancaster, Pa.
[73] Assignee: RCA Corporation, New York, N.Y.

[21] Appl. No.: 379,870
[22] Filed: May 19, 1982
[51] Int. Cl.$^3$ .............................. G03B 41/00
[52] U.S. Cl. .............................. 354/1; 430/24
[58] Field of Search .............................. 354/1; 430/23-26

[56] References Cited

U.S. PATENT DOCUMENTS

| | | | |
|---|---|---|---|
| 3,558,310 | 1/1971 | Mayaud | 96/36.1 |
| 3,788,846 | 1/1974 | Mayaud et al. | 96/36.1 |
| 3,906,515 | 9/1975 | Hosokoshi et al. | 354/1 |
| 3,982,252 | 9/1976 | Yamazaki et al. | 354/1 |
| 4,021,820 | 5/1977 | Chase et al. | 354/1 |
| 4,049,451 | 9/1977 | Law | 96/36.1 |
| 4,132,470 | 1/1979 | van Heek | 354/1 |
| 4,157,215 | 6/1979 | Hanak | 354/1 |

*Primary Examiner*—John Gonzales
*Attorney, Agent, or Firm*—E. M. Whitacre; D. H. Irlbeck; L. Greenspan

[57] ABSTRACT

A method for printing a viewing-screen structure including projecting, at least three times, a light field from a light source, through a lens, an optical filter and incident upon a photosensitive layer. During one of the projecting steps, the light source and the nominal axes of the light source, the lens, the filter and the layer (which are substantially parallel to one another) are aligned along a common axis. During each of the other two projecting steps, the light source and the axis of the lens remain aligned along the common axis, and the axes of the filter and the layer are offset prescribed distances on opposite sides of the common axis.

7 Claims, 4 Drawing Figures

PHOTOGRAPHIC METHOD FOR PRINTING A VIEWING-SCREEN STRUCTURE USING A LIGHT-TRANSMISSION FILTER

BACKGROUND OF THE INVENTION

This invention relates to a novel method for printing a viewing-screen structure for a CRT (cathode-ray-tube), particularly for a multibeam color display tube. The screen structure can be, for example, a light-absorbing matrix or luminescent elements of the viewing screen.

A color television picture tube, which is a type of CRT, comprises an evacuated glass envelope including a faceplate panel having a viewing window, a viewing screen on the inside surface of the window and means for selectively exciting elements of the screen to luminescence. In one type of picture tube, the viewing screen is comprised of interlaced elements having different emission characteristics. Also, the tube includes an apertured shadow mask closely spaced from the viewing screen. The mask is part of the means for selectively exciting the viewing screen, and also is used as a photographic master for depositing the screen structure.

A typical process for fabricating the screen structure includes three photographic exposures, one for defining the elements of each of three different luminescent fields. Each exposure involves projecting a light field from a light source, through a light-refracting lens and a light-transmission filter, incident on a photosensitive layer supported on the inside surface of the viewing window. The lens, the filter and the panel have nominal axes that are substantially parallel to one another. The exposures differ in that the panel is displaced laterally for each exposure relative to the axis of the lens.

Because of the optical characteristics, the brightness of the unfiltered light field drops off from center to edge. To compensate for this, the transmission of the filter increases from center to edge. And, because it is desirable for screen elements to decrease in size from center to edge, the filter produces a brightness profile at the photosensitive layer which produces the desired distribution of screen-element sizes. That distribution is substantially symmetrical around the nominal center of the viewing screen.

Ordinarily, the light source and all of the axes fall on a common axis for one exposure. And, for the two other exposures, only the panel is displaced from this relationship so that the panel axis is on one side and then on the opposite side of the common axis. It has been observed that these two other exposures define screen elements that are larger on one side of the panel than on the other side of the panel. The novel method overcomes this problem by appreciating the cause of this problem and specifying a nonobvious repositioning of the filter in the two other exposures.

SUMMARY OF THE INVENTION

The novel method, as in prior methods, includes projecting, at least a total of three times, a light field from a light source, through a path-refracting lens and a light-transmission filter, incident upon a photosensitive layer. The lens, the filter, and the layer have nominal axes that are substantially parallel to one another. During one of the projecting steps or exposures, the light source and the aforementioned axes are aligned along a common axis. During the other two projecting steps, the light source and the axis of the lens are located along the common axis. However, unlike prior methods, during one of the other projecting steps, the axis of the layer is offset a prescribed first distance to one side of the common axis, and the axis of the filter is offset a prescribed second distance to the opposite side of the common axis. Also, during the other of the projecting steps, the axis of the layer is offset a prescribed third distance to said opposite side of the common axis, and the axis of the filter is offset a prescribed fourth distance to the one side of the common axis.

DESCRIPTION OF THE PREFERRED EMBODIMENT

The preferred embodiment of the invention described below is carried out to produce a light-absorbing matrix having linear openings and also to produce a line screen comprising phosphor stripes of three different emission colors; of red, green and blue, for a color television picture tube having a slit mask and an in-line electron gun. However, the novel method may be practiced for preparing only the matrix or the phosphor stripes, or may be practiced for preparing screens with other patterns than stripes, such as dot screens, with or without a matrix. Also, the tube may have another type of electron gun, such as a delta gun.

Figure 1:
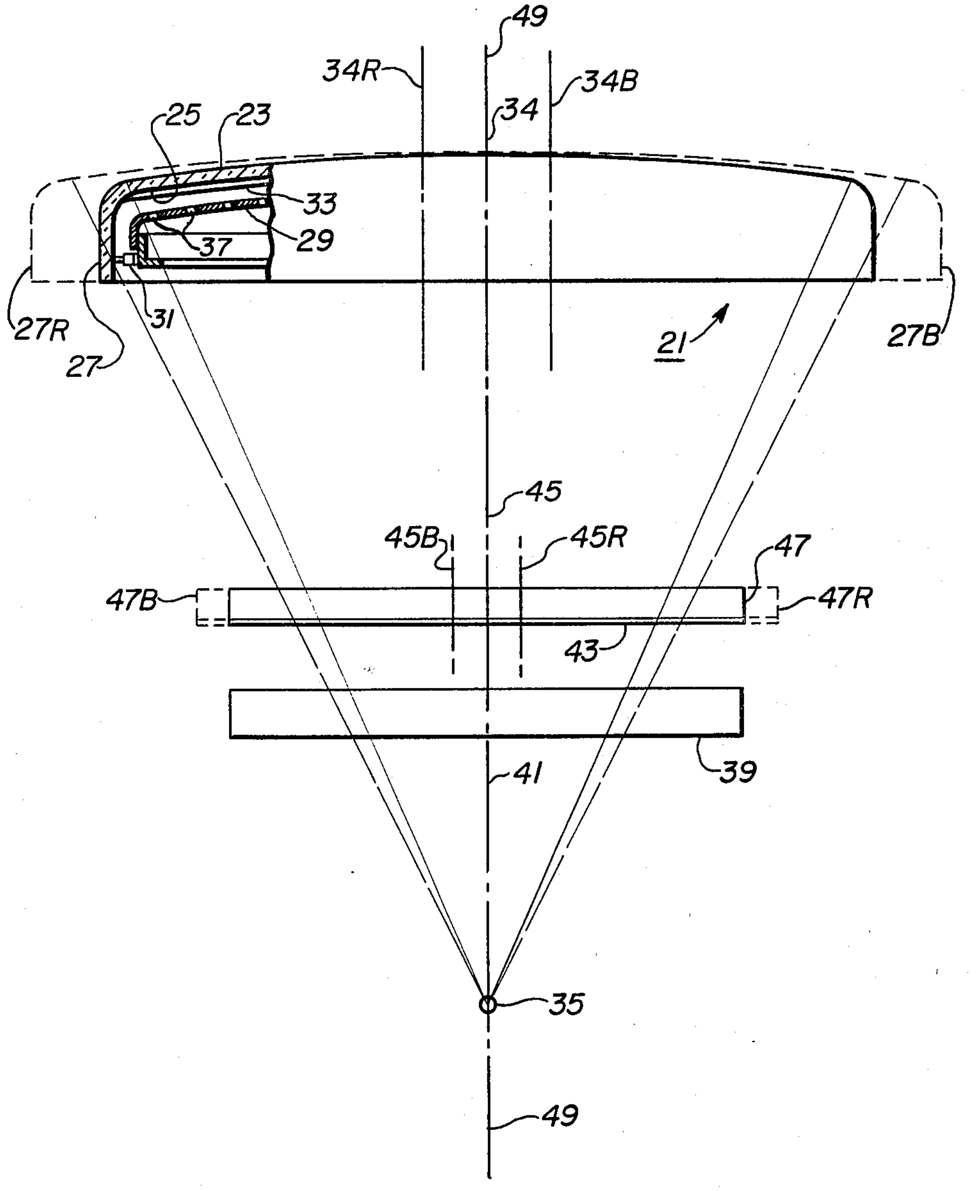
FIG. 1 is a partially-broken away, elevational representation of an optical system for practicing the novel method with the faceplate panel of a CRT.

The preferred embodiment of the novel method may be practiced in a lighthouse having the essential optical components shown in FIG. 1. Except for the use of a trimmer lens and an optical filter, the optical system is similar to the optical system described in U.S. Pat. No. 4,049,451 issued Sept. 20, 1977 to H. B. Law. As shown in FIG. 1, a rectangular faceplate panel 21 on which a screen structure is to be printed comprises (a) a viewing window 23 having an inner surface 25 and (b) an integral peripheral sidewall 27. An apertured shadow mask 29 is detachably mounted to the sidewall 27 by a mounting means 31. A coating 33 of dichromate-sensitized polyvinyl alcohol having a nominal coating axis 34 is supported on the inner surface 25 of the window 23.

A line light source 35 is positioned a specified distance P from the mask 29, which itself is spaced a distance Q from the coating 33, as is known in the art. The mask 29 has an array of slits or elongated apertures 37 therethrough, wherein the length direction is into the drawing, as shown in FIG. 1, and is substantially parallel to the minor axis of the rectangular panel 21. The length direction of the light source 35 is parallel to the direction of the slits 37 and, therefore, also into the drawing as shown in FIG. 1. The light source 35 is typically a high-pressure mercury lamp whose arc is about 25.4 mm (1.0 inch) long and about 1.50 mm (0.06 inch) in diameter.

A main light refractor or lens 39 having a nominal lens axis 41 is in a spaced position from the light source 35 in the light path to the coating 33. A light-transmission filter 43 (also called an intensity-correction filter or an IC filter) having a nominal filter axis 45 is supported on an optically-clear support 47 on the side towards the light source. The IC filter 43 is preferably a half-tone or line filter of the type described in U.S. Pat. No. 4,132,470 issued Jan. 2, 1979 to H. F. van Heek. The filter 43 is spaced between the lens 39 and the window in the above-mentioned light path. The light source 35 and all of the axes 34, 41 and 45 are aligned along a common axis 49.

With no lens 39, no filter 43 and no mask 29 in place, the light from the source 35 on the coating 23 is brightest at the coating axis 34 and decreases as a function of distance from the coating axis 34. The mask 29 has a multiplicity of apertures 39 therethrough which allow light to be transmitted therethrough. The light transmission through the mask 29 is greatest at the mask axis (not shown but which coincides with the coating axis 34) and decreases as a function of distance from the coating axis 34. The filter 43 is least light transmitting at the filter axis 45 and increases as a function of distance from the filter axis 45.

Figure 2:
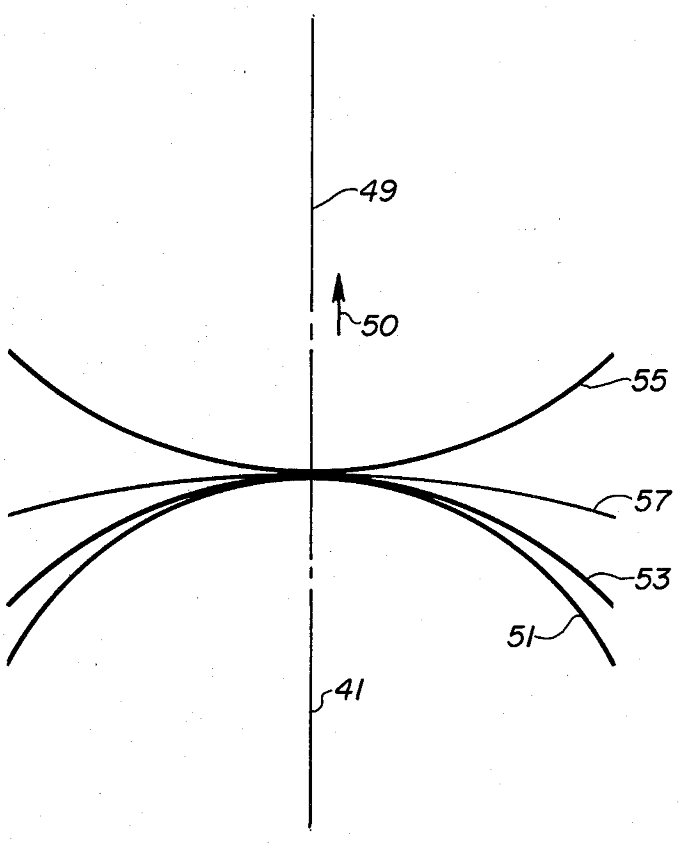
FIGS. 2, 3 and 4 are symbolic representations of the brightness of various light fields and the transmissions of the mask and the filter during three different exposures in the optical system of FIG. 1.

These gradations of brightness and transmission are shown symbolically by the curves in FIG. 2. All of the curves are symmetrical about the common axis 49. Greater values are up as shown by the arrow 50 in FIG. 2, and lesser values are down. The brightness of the unfiltered light field at the coating 33 with no components between it and the source is shown by the curve 51. The transmission of the mask 29 is shown by the curve 53, and the transmission of the filter 43 is shown by the curve 55. The brightness of the resultant or desired light field at the coating 33 after passing through the lens 39, the filter 43 and the mask 29 is shown by the curve 57. This resultant light field is brightest at the common axis 49 and decreases as a function of distance from the axis 49. The brightness distribution in the resultant field is such as to produce screen elements in the coating 33 which grade in size from largest at the axis 49 to smallest at the edge according to a prescription. It is noteworthy that the curves in FIG. 2 change in value from center to edge by different functions.

For producing a light-absorbing matrix, the methods disclosed in U.S. Pat. No. 3,558,310 issued Jan. 26, 1971 to E. E. Mayaud or U.S. Pat. No. 3,788,846 issued Jan. 29, 1974 to E. E. Mayaud et al. are used. With both methods, the coating 33 is exposed three times for making a tricolor screen structure and then is developed; that is, the unexposed and insufficiently-exposed portions are removed, and the sufficiently-exposed portions are retained. Then, the developed pattern is coated with a layer of dark-colored particles, such as graphite. Finally, the retained, exposed portions of the coating 33 and the overlying portions of the dark-colored layer are removed, leaving a matrix having an array of windows which define the elements of a viewing screen.

Figure 3:
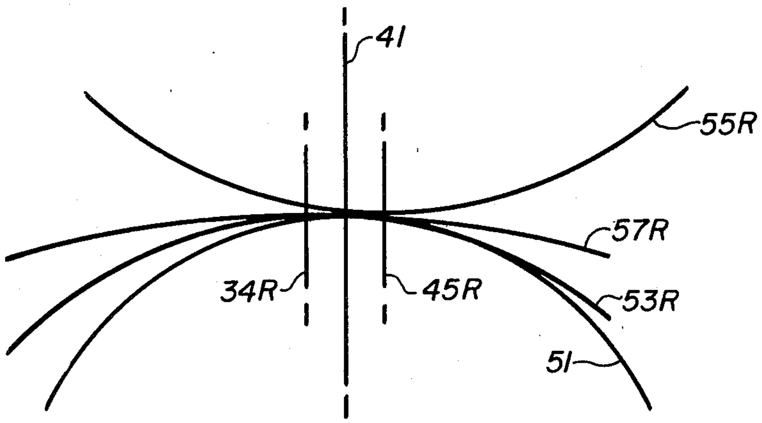

The three exposures mentioned above are carried out with the panel 27 in three different positions with respect to the lens axis 41 shown in FIG. 3. One exposure is carried out with the panel/mask in the position shown by the solid-line position of the panel 27. This arrangement is to produce windows in the matrix for the green-emitting-screen elements in this example. A second exposure is carried out with the panel/mask offset to one side as shown by the dashed-line position of the panel 27R and its axis 34R. This offset is to produce windows in the matrix for the red-emitting screen elements in this example. A third exposure is carried out with the panel/mask offset to the other side as shown by the dotted-line position of the panel 27B and its axis 34B. This offset is to produce windows in the matrix for the blue-emitting elements in this example. The three exposures may be carried out in any order.

When screen structures were prepared as described above without moving the filter 43, it was observed that the screen elements were larger on one side of the common axis 49 than on the other for each of the two exposures with the mask/panel offset. When screen structures were prepared with the filter 43 offset a geometric fraction of the panel offset and in the same direction as the panel offset, the size differential of the screen elements increased.

Figure 4:
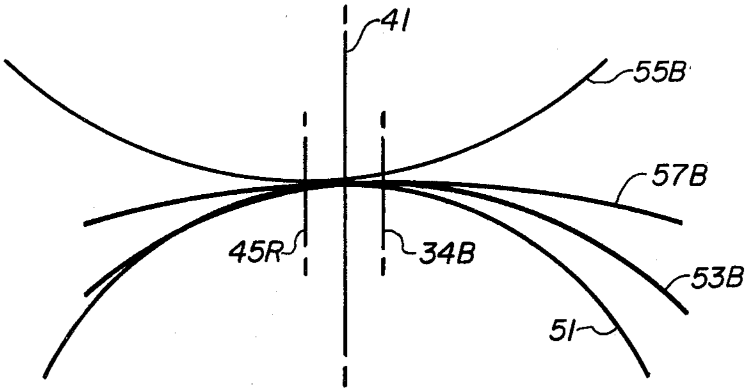

The size differential can be brought to zero, according to the novel method, by offsetting the filter 43 in the direction opposite to that of the panel offset. The amount of the filter offset is generally less than the panel/mask offset and is determined by the relative steepness of the filter transmission curve 55 with respect to the steepness of the desired brightness curve 57. In a typical practice of the novel method, for making a matrix for a 23 V panel, the panel/mask offset is about 6.25 mm (250 mils) in one direction, and the filter offset is about 1.25 to 5.00 mm (50 to 200 mils) in the opposite direction. This relationship is shown symbolically by the curves in FIG. 3 for the second exposure and, for the third exposure, in FIG. 4. In FIG. 3, the curves of the offset elements carry the same numerals as in FIG. 2 followed by the letter R. In FIG. 4, the curves of the offset elements carry the same numerals as in FIG. 2 followed by the letter B.

A convenient formula is used to determine the direction and magnitude of filter offset which will provide the screen-centered brightness curve which is required to produce the specified screen-element sizes:

$$\text{Filter Offset} = \text{Panel Offset} \times \frac{\text{Slope of Desired Curve 57}}{\text{Slope of Filter Curve 55}}$$

This formula has interesting implications in the cases shown in FIGS. 3 and 4. The slopes of the desired curve 57 and the filter transmission curve 55 are of opposite sign, therefore their ratio, appearing in the above equation, is negative. Consequently, as shown in FIGS. 3 and 4, the filter offset must be in the direction opposite the panel offset 43. The panel axis 34R is offset to the left of the lens axis 41, and the filter axis 45R is offset to the right of the lens axis 41 in FIG. 3. In FIG. 4, the panel axis 34B is offset to the right of the lens axis 41, and the filter axis 45B is offset to the left of the lens axis 41.

Having produced the matrix, the phosphor-screen elements may be produced by a similar method using three exposures as described above with the same optical system, but with the following differences. Instead of a single coating 33, which is exposed three times and developed once, there are three phosphor coatings applied successively; each coating is photosensitive and contains particles of a phosphor; one coating with green-emitting phosphor, one coating with red-emitting phosphor and one coating with blue-emitting phosphor. After each phosphor coating is deposited, it is exposed and developed, as is known in the art. A typical phosphor coating consists essentially of phosphor particles and dichromate-sensitized polyvinyl alcohol. While it is not necessary to produce a matrix before producing the phosphor-screen elements, where the matrix has been produced, the phosphor-screen elements should be deposited in the same positions as the matrix-screen elements. However, the exposures for the phosphor-screen elements may be carried out in a different time order than the exposures for the matrix-screen elements were carried out. Also it has been found by experience that, for the same size panel and panel offsets, the filter offsets for producing the phosphor-screen elements need not be as large as for the matrix-screen elements.

The novel method may be practiced on several different equipments with optical systems that are substantially the same. Thus, in the example above, the three exposures may be carried out on one exposure lighthouse or on three exposure lighthouses for producing one or both of the matrix elements and the phosphor-screen elements. Also, instead of the half-tone filter used, any other filter or shader (dodger) may be used.

What is claimed is:

1. In a method for printing a viewing-screen structure for a cathode-ray tube including projecting a light field from a light source through a path-refracting lens, a light-transmission filter and incident upon a photosensitive layer, said lens, filter and layer having nominal axes that are substantially parallel to one another, and repeating said projecting step at least a total of three times, the combination of requirements that A. during one of said projecting steps, said light source and said axes are aligned along a common axis, B. during another of said projecting steps, said light source and the axis of said lens are aligned along said common axis, the axis of said layer is offset a prescribed first distance to one side of said common axis, and the axis of said filter is offset a prescribed second distance to the opposite side of said common axis and C. during the other of said steps, said light source and the axis of said lens are aligned along said common axis, the axis of said layer is offset a prescribed third distance to said opposite side of said common axis, and the axis of said filter is offset a prescribed fourth distance to said one side of said common axis.

2. The method defined in claim 1 wherein the light source and the lens remain stationary throughout steps A., B. and C., and said filter and said layer are physically moved to satisfy said combination of requirements.

3. The method defined in claim 1 wherein said first distance is greater than said second distance, and said third distance is greater than said fourth distance.

4. The method defined in claim 1 wherein said layer is supported on the inner surface of the viewing window of said tube.

5. The method defined in claim 4 wherein said viewing window is part of a faceplate panel, and an apertured shadow mask is supported in said panel during each of said projecting steps.

6. The method defined in claim 5 wherein said screen structure is a light-absorbing matrix, and after said three projecting steps, said mask is removed from said panel and said layer is developed.

7. The method defined in claim 5 wherein said screen is a luminescent screen comprised of interlaced screen elements of three different emission characteristics and, after each projecting step, said mask is removed from said panel and said layer is developed.

* * * * *